United States Patent
Settelmayer et al.

(10) Patent No.: US 6,422,441 B1
(45) Date of Patent: Jul. 23, 2002

(54) APPARATUS FOR SECURING RECREATIONAL EQUIPMENT TO VEHICLE-MOUNTED RACKS

(75) Inventors: Joseph J. Settelmayer, Fieldbrook; Daniel M. Humes, Trinidad; Gregory A. Dean, McKinleyville, all of CA (US)

(73) Assignee: Yakima Products, Inc., Arcata, CA (US)

( * ) Notice: Subject to any disclaimer, the term of this patent is extended or adjusted under 35 U.S.C. 154(b) by 0 days.

(21) Appl. No.: 09/540,619

(22) Filed: Mar. 31, 2000

Related U.S. Application Data (63) Continuation-in-part of application No. 09/505,056, filed on Feb. 16, 2000, which is a continuation-in-part of application No. 09/447,908, filed on Nov. 23, 1999, now Pat. No. 6,283,310.

(51) Int. Cl.$^7$ .............................. B60R 9/052; B60R 9/10
(52) U.S. Cl. ...................... 224/324; 224/331; 224/558; 224/924
(58) Field of Search .............................. 224/324, 331, 224/558, 570, 924

(56) References Cited

U.S. PATENT DOCUMENTS

| | | |
|---|---|---|
| 357,287 A | 2/1887 | Nolte |
| 376,055 A | 1/1888 | Hopkins et al. |
| 1,505,883 A | 8/1924 | Gleason |
| 2,271,452 A | 1/1942 | Carroll |
| 2,764,438 A | 9/1956 | Haviland |
| 2,895,748 A | 7/1959 | Oldham |
| 3,204,839 A * | 9/1965 | Yuda et al. ................. 224/924 |
| 3,239,115 A | 3/1966 | Bott et al. |
| 3,258,820 A | 7/1966 | Steinberg |
| 3,292,222 A | 12/1966 | Steinberg |
| 3,460,788 A | 8/1969 | Goldman |
| 3,662,435 A | 5/1972 | Allsop |
| 3,668,791 A | 6/1972 | Salzman et al. |
| 3,828,993 A | 8/1974 | Carter |
| 3,848,784 A | 11/1974 | Shimano et al. |
| 3,900,923 A | 8/1975 | Thomas |
| 3,906,593 A | 9/1975 | Caveney et al. |
| 3,922,018 A | 11/1975 | Shook |
| 4,021,888 A | 5/1977 | Aimar |
| 4,028,915 A | 6/1977 | Stahl |
| 4,112,557 A | 9/1978 | Salomon |
| 4,114,409 A | 9/1978 | Scire |
| 4,193,171 A | 3/1980 | Lichowsky |
| 4,274,569 A | 6/1981 | Winter et al. |
| 4,310,951 A | 1/1982 | Riedel |
| 4,326,320 A | 4/1982 | Riedel |

(List continued on next page.)

FOREIGN PATENT DOCUMENTS

| | | |
|---|---|---|
| CH | 272137 | 4/1949 |
| DE | 3034750 | 4/1982 |
| EP | 0 161 441 A1 | 11/1985 |
| EP | 0 220 784 A1 | 5/1987 |
| EP | 0 224 288 A1 | 6/1987 |
| FR | 2 221 329 | 11/1974 |
| FR | 2 332 155 | 7/1977 |
| IT | 022451 | 11/1989 |

*Primary Examiner*—Stephen P. Garbe
(74) *Attorney, Agent, or Firm*—Kolisch Hartwell Dickinson McCormack & Heuser (57) ABSTRACT

Apparatus for securing recreational equipment to a vehicle-mounted rack. The apparatus includes a load-carrying member adapted to carry recreational equipment adjacent a vehicle, and a clamping member adapted to secure the load-carrying member to a crossbar of the vehicle rack. The clamping member is configured to clamp to at least two different styles of crossbars to prevent relative movement between the load-carrying member and the crossbar. Optionally, the clamping member may be configured to snap onto the crossbar.

25 Claims, 4 Drawing Sheets

U.S. PATENT DOCUMENTS

| | | |
|---|---|---|
| 4,424,636 A | 1/1984 | Everest |
| 4,453,290 A | 6/1984 | Riedel |
| 4,501,354 A | 2/1985 | Hoffman |
| 4,547,980 A | 10/1985 | Olivieri |
| 4,553,292 A | 11/1985 | Praider et al. |
| 4,555,830 A | 12/1985 | Petrini et al. |
| 4,596,080 A | 6/1986 | Benoit et al. |
| 4,614,047 A | 9/1986 | Arieh et al. |
| 4,619,122 A | 10/1986 | Simpson |
| 4,621,873 A | 11/1986 | Weinstein et al. |
| 4,624,063 A | 11/1986 | Delery |
| 4,629,104 A | 12/1986 | Jacquet |
| 4,646,401 A | 3/1987 | Morell |
| 4,670,946 A | 6/1987 | Olivieri |
| 4,683,620 A | 8/1987 | Valsecchi et al. |
| 4,724,692 A | 2/1988 | Turin et al. |
| 4,727,630 A | 3/1988 | Alan |
| 4,759,137 A | 7/1988 | Lederer |
| 4,761,859 A | 8/1988 | Calabrigo |
| 4,761,898 A | 8/1988 | Courvoisier et al. |
| 4,763,957 A | 8/1988 | Poehlmann et al. |
| 4,770,011 A | 9/1988 | Constant |
| 4,789,206 A | 12/1988 | Ozaki |
| 4,796,337 A | 1/1989 | Marxer |
| 4,842,148 A | 6/1989 | Bowman |
| 4,887,754 A | 12/1989 | Boyer et al. |
| 4,912,817 A | 4/1990 | Sandreid |
| 4,934,572 A | 6/1990 | Bowman et al. |
| 4,951,487 A | 8/1990 | Dennis |
| 4,964,287 A | 10/1990 | Gaul |
| 5,003,711 A | 4/1991 | Nerrinck et al. |
| 5,005,390 A | 4/1991 | Giannini et al. |
| 5,007,260 A | 4/1991 | Sharp |
| 5,009,350 A * | 4/1991 | Schill et al. ................ 224/324 |
| 5,022,672 A | 6/1991 | Kawai |
| 5,027,628 A | 7/1991 | De Rocher et al. |
| 5,037,019 A | 8/1991 | Sokn |
| 5,042,705 A | 8/1991 | Johansson |
| 5,052,605 A | 10/1991 | Johansson |
| 5,065,921 A | 11/1991 | Mobley |
| 5,067,644 A * | 11/1991 | Coleman .................... 224/324 |
| 5,083,350 A | 1/1992 | Sandreid |
| 5,118,125 A | 6/1992 | Plunkett |
| 5,135,330 A | 8/1992 | Chen |
| 5,165,762 A | 11/1992 | Phillips |
| 5,169,044 A | 12/1992 | Englander |
| 5,172,454 A | 12/1992 | Martignago |
| 5,193,254 A | 3/1993 | Geisinger |
| 5,226,341 A | 7/1993 | Shores |
| 5,232,134 A | 8/1993 | Allen |
| 5,275,319 A | 1/1994 | Ruana |
| 5,288,001 A | 2/1994 | Locarno |
| 5,291,763 A | 3/1994 | Cuisinot |
| 5,314,104 A * | 5/1994 | Lee ............................ 224/321 |
| 5,357,690 A | 10/1994 | Ho |
| 5,362,173 A | 11/1994 | Ng |
| 5,416,952 A | 5/1995 | Dodge |
| 5,419,479 A * | 5/1995 | Evels et al. ................. 224/321 |
| 5,426,826 A | 6/1995 | Takimoto |
| 5,492,258 A * | 2/1996 | Brunner ..................... 224/321 |
| 5,499,430 A | 3/1996 | Strazar |
| 5,511,894 A | 4/1996 | Ng |
| 5,526,555 A | 6/1996 | Battistella et al. |
| 5,570,825 A | 11/1996 | Cona |
| 5,573,165 A | 11/1996 | Bloemer et al. |
| 5,598,959 A | 2/1997 | Lorensen et al. |
| 5,745,959 A | 5/1998 | Dodge |
| 5,752,298 A | 5/1998 | Howell |
| 5,769,292 A * | 6/1998 | Cucheran et al. ........... 224/324 |
| 5,779,116 A * | 7/1998 | Rosch et al. ................ 224/324 |
| 5,845,827 A * | 12/1998 | Reising ...................... 224/316 |
| 6,112,965 A * | 9/2000 | Lundgren ................... 224/322 |

* cited by examiner

APPARATUS FOR SECURING RECREATIONAL EQUIPMENT TO VEHICLE-MOUNTED RACKS

CROSS-REFERENCE TO RELATED APPLICATION

This application is a continuation-in-part of U.S. patent application Ser. No. 09/505,056, filed Feb. 16, 2000, which is a continuation-in-part of U.S. patent application Ser. No. 09/447,908, filed Nov. 23, 1999, now U.S. Pat. No. 6,283,310.

TECHNICAL FIELD

The present invention relates generally to vehicle-mounted racks, and more particularly to securing recreational equipment to vehicle-mounted racks having different crossbar styles.

BACKGROUND

In response to the increasing popularity of outdoor recreational activities such as bicycling, skiing, canoeing, etc., a variety of vehicle-mounted racks have been developed to allow recreational equipment to be carried on a vehicle. These vehicle racks typically include rigid crossbars extending over the roof of the vehicle or adjacent the rear of the vehicle. Various load-carrying members adapted to support particular types of recreational equipment are mounted on the cross bars. For example, one type of load-carrying member might be used to carry a bicycle and a different type of load-carrying member might be used to carry a canoe. Thus, a recreational enthusiast may purchase a single rack for his or her vehicle, and then purchase one of a variety of load-carrying members depending on the equipment to be carried.

As might be expected, the vehicle racks of different manufacturers often are not compatible. Specifically, different manufacturers may use different styles of crossbars. As a result a load carrying-member designed for one crossbar style cannot be used with a vehicle rack having a different crossbar style.

SUMMARY OF THE INVENTION

The invention provides an apparatus for securing recreational equipment to a vehicle-mounted rack. The apparatus includes a load-carrying member adapted to carry recreational equipment adjacent a vehicle, and a clamping member adapted to secure the load-carrying member to a crossbar of the vehicle rack. The clamping member is configured to clamp to at least two different styles of crossbars to prevent relative movement between the load-carrying member and the crossbar. Optionally, the clamping member may be configured to snap onto the crossbar.

DETAILED DESCRIPTION

Figure 1:
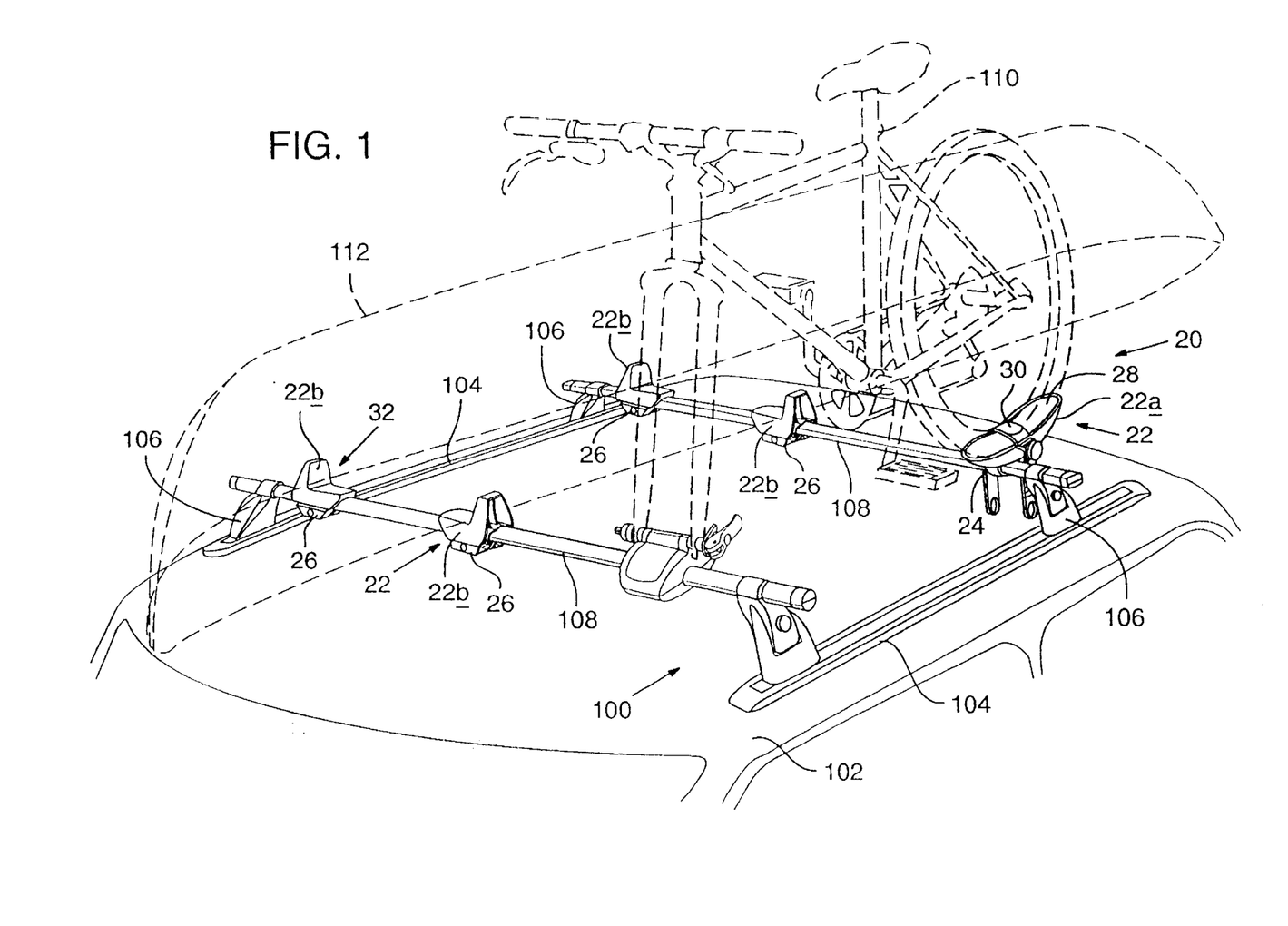
FIG. 1 is a perspective view of an exemplary apparatus for securing recreational equipment to vehicle-mounted racks according to the present invention.

An exemplary system or apparatus for securing recreational equipment to a vehicle-mounted rack is indicated generally at 20 in FIG. 1. Apparatus 20 includes one or more load-carrying members 22 adapted to at least partially support recreational equipment. Apparatus 20 also includes a mount or clamping member 24, 26 associated with each load-carrying member to secure the load-carrying member to a vehicle-mounted rack. The clamping members are configured for use with at least two different styles of racks.

In the exemplary embodiment, the invention is shown in the context of a vehicle rack 100 mounted to the roof of a vehicle 102. Vehicle 102 may be any type of vehicle (e.g., car, van, truck, etc.) and includes parallel tracks 104 extending along opposite sides of the roof. Rack 100 includes opposing towers 106 attached to tracks 104. Crossbars 108 extend across the roof of the vehicle between opposing towers. While one exemplary vehicle-mounted rack has been shown and described, it will be appreciated that the invention would be useful with a variety of different vehicle racks including racks mounted on other portions of vehicle 102 such as the rear or trunk of the vehicle.

Load-carrying members 22 (also referred to herein as accessory support members) may be any suitable device or apparatus adapted to support recreational equipment adjacent a vehicle. Examples of suitable load-carrying members are described in U.S. Pat. Nos. 5,820,002; 5,685,686; 5,951,231; 5,094,373, and U.S. patent application Ser. Nos. 09/466,233; 09/280,504; 29/099,023; 09/505,056; 09/447,908; and 09/513,664, all the disclosures of which are herein incorporated by reference. Two exemplary load-carrying members 22a and 22b are shown and described herein. Load-carrying member 22a includes a concave tray portion 28 adapted to receive and support the wheel of a bicycle 110. Load-carrying member 22a may also include a strap 30 or similar device to secure the bicycle wheel to the tray. Load-carrying member 22b includes an L-shaped support region 32 adapted to support a variety of recreational equipment such as canoe 112. One or more straps (not shown) may be arranged about canoe 112 to secure the canoe to load-carrying members 22b. While bicycle 110 and canoe 112 have been used to illustrate exemplary recreational equipment, it will be appreciated that the load-carrying members may be adapted and used for any type of recreational equipment including equipment for skiing, camping, boating, hiking, sailing, flying, etc.

As mentioned above, load-carrying members 22 are secured to crossbars 108 by clamping members 24, 26. According to the present invention, the clamping members are configured to clamp to crossbars having at least two different cross-sectional shapes. In the exemplary embodiment of the invention described herein, the clamping members are adapted to clamp to both round and rectangular cross-section. However, clamping members adapted to clamp to crossbars having other cross-sections are also within the scope of the invention. For purposes of illustration only, the exemplary rack in FIG. 1 is shown with a round crossbar toward the front of the vehicle and a rectangular crossbar toward the rear of the vehicle. However, it will be understood that most vehicle racks use crossbars of a single type (i.e., both round or both rectangular, etc.). In any event, clamping members 24, 26 are not limited to one particular crossbar style, but may be used with a variety of different styles.

Turning attention now to FIGS. 2–5, one exemplary clamping member 24 is shown which is configured to clamp to crossbars having either round or rectangular cross-sections. Clamping member 24 is formed to define an opening 34 adapted to receive a crossbar. Opening 34 includes alternative clamping surfaces 36, 38. Clamping surfaces 36 are adapted to conform to, and tightly grip, a round crossbar. Clamping surfaces 38 are adapted to conform to, and tightly grip, a rectangular crossbar. Clamping member 24 includes one or more moveable structures 40 disposed within opening 34. As will be described in more detail below, movable structures 40 are selectively adjustable to expose the alternative clamping surfaces and change the shape of opening 34 to correspond to either a round crossbar or a rectangular crossbar.

Figures 2, 3, 4:
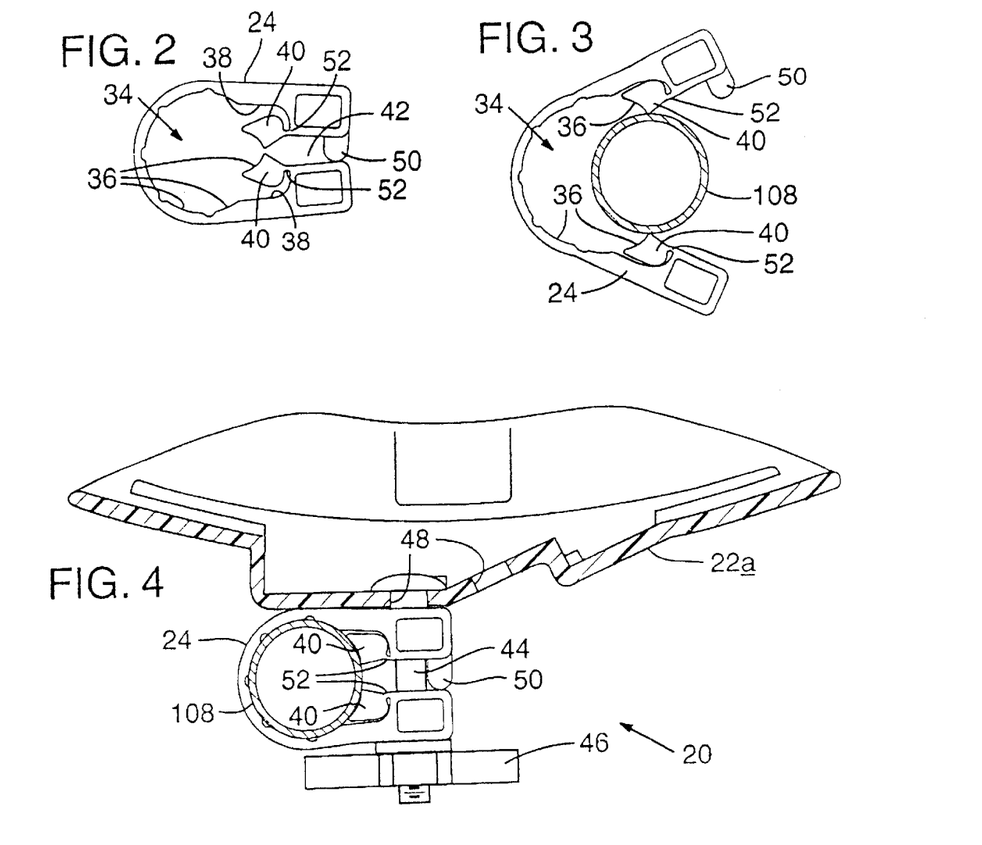
FIG. 2 is a side elevation of an exemplary crossbar clamping member according to the present invention.
FIG. 3 is a side elevation of the clamping member of FIG. 2, showing the clamping member expanded to snap onto a crossbar.
FIG. 4 is a side elevation of the clamping member of FIG. 2, showing the clamping member clamped onto a round crossbar to secure a load-carrying member to the crossbar.

Clamping member 24 may be installed on a crossbar by sliding the clamping member over one end of the crossbar. Alternatively, clamping member 24 may be formed as a snap-on clamp. As shown in FIGS. 2–3, clamping member 24 is integrally formed of a single substantially rigid, yet flexible material, with a channel 42 leading from an exterior portion of the clamp to opening 34. One example of a suitable material is Nylon 6/6. The clamping member may be resiliently flexed to expand the width of the channel and allow the crossbar to pass through the channel and be received in the opening. Similarly, the clamping member may be flexed open to remove it from the crossbar.

As shown in FIG. 4, the flexibility of the clamping member also allows it to be tightened securely around the crossbar. The clamping member includes holes (not shown) adapted to receive a threaded bolt 44. A wing nut 46 receives the bolt and tightens the clamping member around the crossbar. Typically, bolt 44 also extends through a hole 48 in the load-carrying member to attach the clamping member to the load-carrying member. One or more tabs 50 extend from the clamping member into channel 42 to prevent the clamping member from being over-tightened.

As can be seen in FIGS. 2–4, movable structures 40 are integrally formed with clamping member 34 and connected by a living hinge 52 that allows the structures to pivot relative to the clamping member. The hinged structures extend into opening 34 and include round clamping surfaces 36. When the clamping member is snapped onto a round cross bar, the hinged structures bend outward to align clamping surfaces 36 to the crossbar. As the clamping member is tightened around the round crossbar, the hinged members press tightly against and grip the crossbar.

Typically, hinge 52 is positioned to support moveable structures 40 during clamping. In the exemplary embodiment shown in FIGS. 2–4, the hinge is positioned in an orientation generally parallel to the direction of clamping force applied to the crossbar by the structures. As a result, the hinge is compressed rather than flexed during clamping. In addition, the hinged structures may be shaped to press against the sides of opening 34, which provides additional support to the structures. In the exemplary embodiment shown in FIG. 4, the hinged structures are configured to press against rectangular clamping surfaces 38 when clamping to a round crossbar.

The combined clamping surfaces on hinged structures 40 and opening 34 substantially conform to a round crossbar. In particular, clamping surfaces 36 are shaped to grip a round crossbar tightly enough to prevent the clamping member and load-carrying member from sliding along or rotating about the crossbar under normal loads experienced during use. In contrast, a clamping member with only a rectangular opening, even if sized to receive a round crossbar, would not be capable of gripping the round crossbar tightly enough to prevent relative movement in use.

Figure 5:
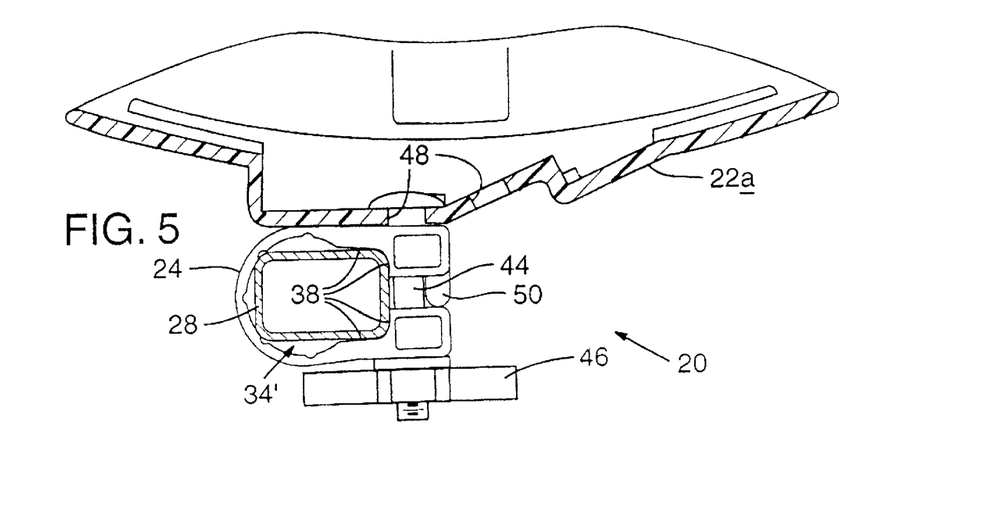
FIG. 5 is a side elevation of the clamping member of FIG. 2, showing the clamping member clamped onto a rectangular crossbar to secure a load-carrying member to the crossbar.

Turning attention to FIG. 5, it can be seen that clamping member 24 also is configured to clamp to a rectangular crossbar. Hinged structures 40 are electively removable to expose rectangular clamping surfaces 38. Hinged structures 40 may be removed by breaking or cutting hinges 52. Once structures 40 are removed clamping member 24 defines a new opening 34' configured to receive a rectangular crossbar. Clamping member 24 may be adapted to snap onto and grip the crossbar, or may be slid over an end of the crossbar. Clamping surfaces 38 are shaped to conform to a rectangular crossbar, and grip it tightly enough to prevent the clamping member and load-carrying member from sliding along or rotating about the crossbar. In contrast, a clamping ho member with only a round opening, even if sized to receive a rectangular crossbar, would not be capable of gripping the rectangular crossbar tightly enough to prevent relative movement.

While structures 40 have been described above as being attached to the clamping member by a hinge, alternative attachments may also be used within the scope of the invention. As one example, the structures may be slidably attached to the clamping member by a locking tongue-and-groove coupling, etc. As a further alternative, the hinged structures described above may be bent or folded into channel 42 to expose clamping surfaces 38 and define new opening 34'.

Figure 6:
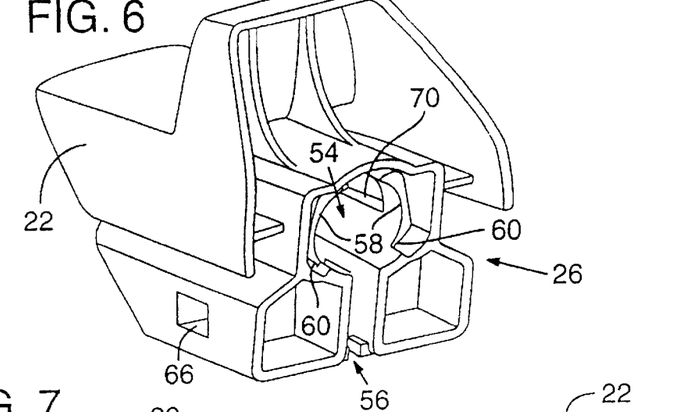
FIG. 6 is a rear isometric view of another clamping member integrally formed with a load-carrying member according to the present invention.
Figure 7:
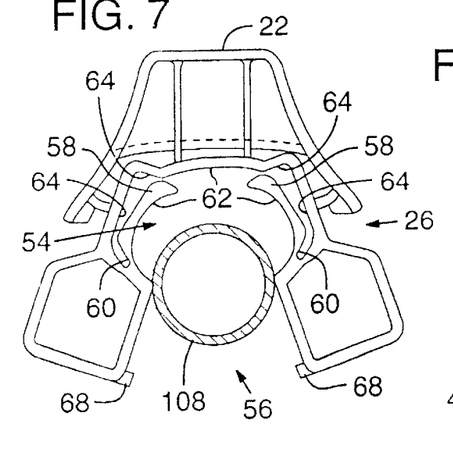
FIG. 7 is a side elevation showing the clamping member of FIG. 6 expanded to snap onto a round crossbar.

Turning attention now to FIGS. 6–10, another exemplary clamping member 26 is shown. Clamping member 26 is integrally formed with load-carrying member 22 from a single material. Typically, the clamping member and load-carrying member are formed from a substantially rigid, yet flexible material such as SANTOPRENE or a similar thermoplastic. In the exemplary embodiment, the clamping member is configured to snap onto a crossbar as shown in FIG. 7. Clamping member 26 is formed to define an opening 54 adapted to receive at least two different crossbar styles. A channel 56 leads from an exterior portion of the clamp to opening 54. The clamping member may be resiliently flexed to expand the width of the channel and allow the crossbar to be installed in, or removed from, the opening. Alternatively, the clamping member may be slid over one end of the crossbar.

Selectively-movable structures 58 are attached to clamping member 26 by hinges 60, and extend into opening 54. It should be noted that placing the hinge near the No channel causes the structures to flex outward automatically, making installation of the clamping member on the crossbar easier. In the exemplary embodiment, structures 58 are selectively movable to expose alternative clamping surfaces 62, 64, and change the shape of opening 54 to correspond to either a round crossbar or a rectangular crossbar.

Figure 8:
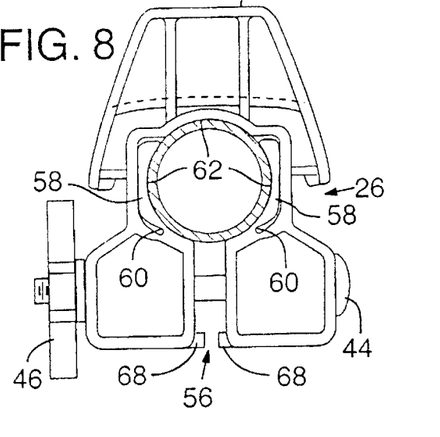
FIG. 8 is a side elevation showing the clamping member of FIG. 6 clamped onto a round crossbar.

As shown in FIG. 8, exemplary clamping member 26 is configured to conform to a round crossbar. Round clamping surfaces 62 grip the bar tightly enough to prevent relative movement between the load-carrying member and the crossbar. Bolt 44 extends through holes 66 and is received into wing nut 46 to tighten the clamping member around the crossbar. A pair of opposed tabs 68 prevent the clamp from being over-tightened. When clamping member 26 is clamped to a round crossbar, structures 58 flex outward to form a round opening and fit around the crossbar. The structures press against, and are supported by, rectangular clamping surfaces 64 to exert inward clamping forces on the crossbar.

Figure 9:
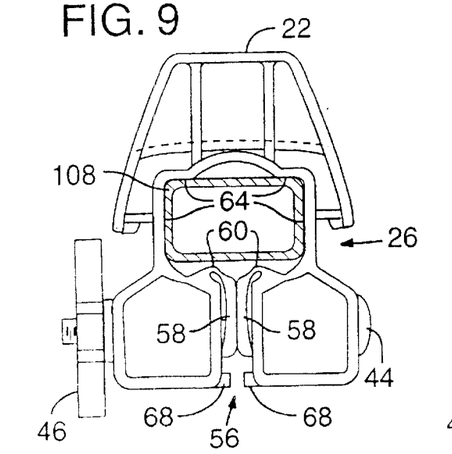
FIG. 9 is a side elevation showing the clamping member of FIG. 6 clamped onto a rectangular crossbar.

Exemplary clamping member 26 also is configured to conform to a rectangular crossbar. In FIG. 9, structures are pivoted down into channel 56 to expose clamping surfaces 64. As best seen in FIG. 6, structures 58 include slots 70 positioned to fit around bolt 44. Thus, structures 58 are adjustable between a first position to grip a round crossbar (shown in FIG. 8), and a second position to grip a rectangular crossbar (shown in FIG. 9). In the second position, opening 54 is adapted to receive a rectangular crossbar. Rectangular clamping surfaces 64 conform to a rectangular crossbar and grip it tightly enough to prevent relative movement between the load-carrying member and the crossbar. To move the clamping members from a rectangular crossbar to a round crossbar, a user pivots structures 58 back into position within opening 54. Thus, clamping member 26 may be moved repeatedly between rectangular and round crossbars.

Figure 10:
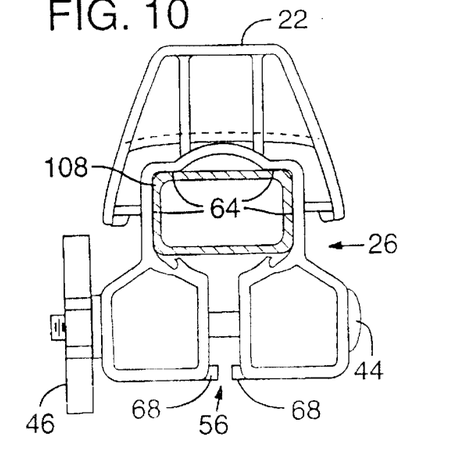
FIG. 10 is a side elevation showing the clamping member of FIG. 6 clamped onto a rectangular crossbar.

Alternatively, structures 58 may be removed, such as by breaking hinges 60. With the structures removed, rectangular clamping surfaces 64 are exposed and opening 54 is configured to receive a rectangular crossbar, as shown in FIG. 10.

While clamping member 26 has been described above as integrally formed with load-carrying member 22, it will be appreciated that the clamping member and load-carrying member may alternatively be formed separately and connected by any suitable mechanism such as a bolt, etc. In addition, it will be appreciated that structures 58 may be attached to clamping member 26 in a wide variety of ways rather than hinge 60. For example, structures 58 may be slidably attached to the clamping member with a locking tongue-and-groove connection, etc.

Figure 11:
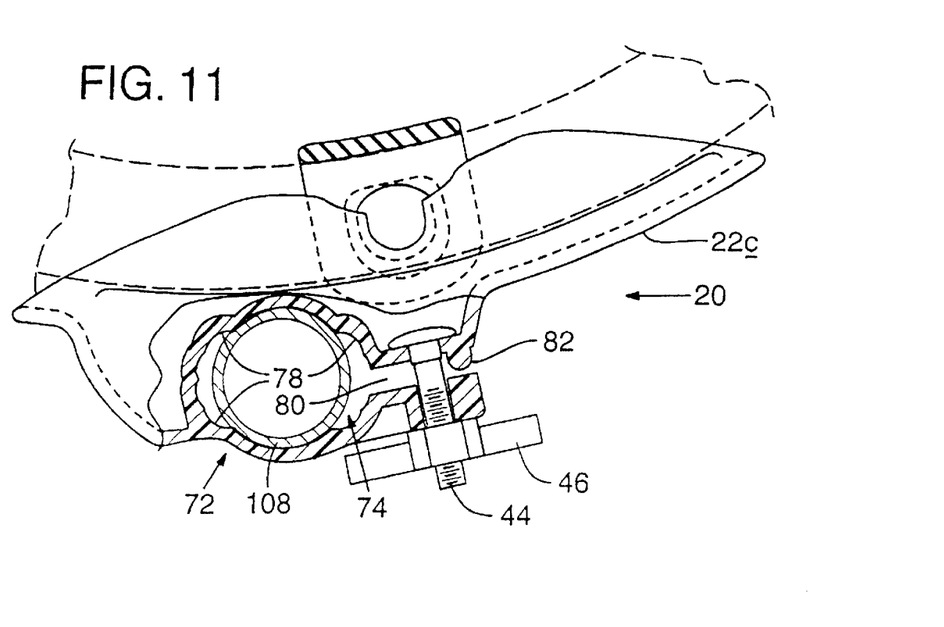
FIG. 11 is a side elevation and partially cross-sectional view of another exemplary apparatus for securing recreational equipment to vehicle-mounted racks according to the present invention, showing the apparatus clamped onto a round crossbar.
Figure 12:
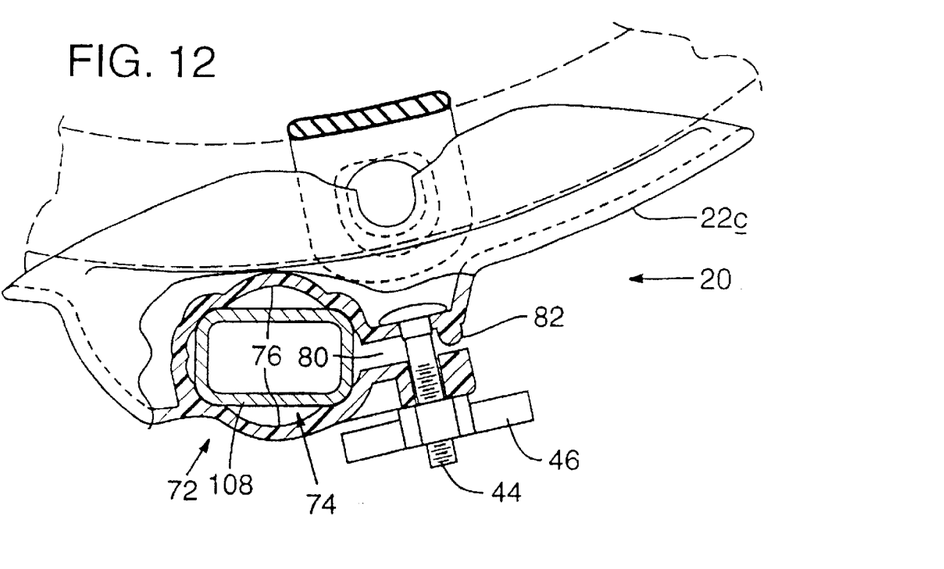
FIG. 12 is a side elevation and partially cross-sectional view showing the apparatus of FIG. 11 clamped onto a rectangular crossbar.

Turning attention now to FIGS. 11 and 12, an alternative embodiment of apparatus 20 is shown. In this embodiment, apparatus 20 includes any suitable support member 22c adapted to support recreational equipment adjacent a vehicle. As depicted in FIGS. 11 and 12, support member 22c is similar to load-carrying member 22a. Apparatus 20 also includes a clamping member 72 adapted to attach the support member to a crossbar 108. Clamping member 72 defines an opening 74 that will conform to grip crossbars with at least two different cross-sectional shapes. In the exemplary embodiment depicted in FIGS. 11 and 12, opening 74 is configured to conform to both round and rectangular crossbars. However, it will be appreciated that opening 74 may alternatively be configured to conform to other crossbar styles in addition to, or instead of, the round and rectangular crossbars.

In any event, clamping member 72 is integrally formed from a single substantially rigid, yet flexible material, such as SANTOPRENE. The clamping member may be integrally formed with the support member, as shown in FIGS. 11 and 12. Alternatively, the clamping member and support member may be formed separately and connected by a suitable mechanism such as bolt 44. Opening 74 includes round clamping surfaces 76 and rectangular clamping surfaces 78. Round clamping surfaces 76 are adapted to grip a round crossbar tightly enough to prevent relative movement between the support member and the crossbar. Similarly, rectangular clamping surfaces 78 are adapted to grip a rectangular crossbar tightly enough to prevent relative movement between the support member and the crossbar.

In the exemplary embodiment, the clamping member is configured to snap onto a crossbar, and includes a channel 80 that leads from an exterior portion of the clamp to opening 74. The clamping member may be resiliently flexed to expand the width of the channel and allow the crossbar to be installed in, or removed from, the opening. Alternatively, the clamping member may be slid over one end of a crossbar. A bolt 44 extends through the clamping member and is received by a wing nut 46. The wing nut is operable to tighten clamping member 72 around the crossbar. A tab 82 prevents the clamping member from being over-tightened.

As described above, apparatus 20 provides a universal mounting system for securing load-carrying members to vehicle-mounted racks. Apparatus 20 allows owners of vehicle racks to mount any desired load-carrying member on their vehicle racks regardless of which style crossbar their vehicle rack uses.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A mount for securing accessories to a bar of a vehicle-mounted rack, comprising:

a clamping portion including structure that defines an opening configured to receive and grip a bar having a first shape;

where at least a portion of the structure is selectively-removable so that the remaining structure defines a new opening configured to receive and grip a bar having a second shape different than the first shape and, wherein the structure is integrally formed from a single material.

2. The mount of claim 1, wherein the selectively-removable portion of the structure is attached to the clamping portion by a breakable hinge.

3. The mount of claim 1, wherein the clamping portion is configured to snap onto the bar.

4. A mount for securing accessories to a bar of a vehicle-mounted rack, comprising:

a clamping portion including structure that defines an opening configured to receive and grip a bar having a first shape;

where at least a portion of the structure is selectively-removable so that the remaining structure defines a new opening configured to receive and grip a bar having a second shape different than the first shape and the clamping portion and the accessory support portion are integrally formed from a single material.

5. Apparatus for securing recreational equipment to a cross-bar of a vehicle-mounted rack, the system comprising:

a load-carrying member adapted to at least partially secure a piece of recreational equipment;

a cross-bar mounting member associated with the load-carrying member and configured to conformably clamp onto a cross-bar having either a rectangular or a round cross-section to thereby secure the load-carrying member against movement relative to the cross-bar, wherein the mounting member includes a channel leading from an exterior portion of the mounting member to an opening adapted to receive the cross-bar, the channel having a width that can be enlarged to allow the bar to be passed through the channel for installation into and removal from the opening and reduced to grip the bar when the bar is located in the opening, and the mounting member includes hinged structures extending into the opening to grip the cross-bar.

6. The apparatus of claim 5, wherein the hinged structures are selectively-removable.

7. The apparatus of claim 5, wherein the hinged structures are selectively-movable to expose alternative gripping surfaces within the opening.

8. The apparatus of claim 5, wherein the hinged structures are selectively-movable between a first position and a second position, and wherein the hinged structures are configured to grip a round crossbar when in the first position and a rectangular crossbar when in the second position.

9. Apparatus for securing recreational equipment to a cross-bar of a vehicle-mounted rack, the system comprising:

a load-carrying member adapted to at least partially secure a piece of recreational equipment;

a snap-around cross-bar mounting member associated with the load-carrying member and configured to conformably clamp onto a cross-bar having either a rectangular or a round cross-section to thereby secure the load-carrying member against movement relative to the cross-bar, wherein the load-carrying member and the mounting member are integrally formed from a single material.

10. A system for securing recreational equipment to a cross-bar of a vehicle-mounted rack, the system comprising:

a load-carrying member adapted to carry recreational equipment adjacent a vehicle; and a clamping member associated with the load-carrying member, the clamping member defining an opening to receive and clamp onto the cross-bar;

where the clamping member includes structure selectively-adjustable by a user to change the shape of the opening to correspond to a selected one of a round cross-bar or a rectangular cross-bar, wherein the structure is hinged and is removable from the clamping member by fracturing the hinge.

11. A system for securing recreational equipment to a cross-bar of a vehicle-mounted rack, the system comprising:

a load-carrying member adapted to carry recreational equipment adjacent a vehicle; and a clamping member associated with the load-carrying member, the clamping member defining an opening to receive and clamp onto the cross-bar;

where the clamping member includes structure selectively-adjustable by a user to change the shape of the opening to correspond to a selected one of a round cross-bar or a rectangular cross-bar, wherein the load-carrying member and the clamping member are integrally formed from a single material.

12. A system for securing recreational equipment to a cross-bar of a vehicle-mounted rack, the system comprising:

a load-carrying member adapted to carry recreational equipment adjacent a vehicle; and a clamping member associated with the load-carrying member, the clamping member defining an opening configured to receive the cross-bar;

where the clamping member includes structure that is selectively-movable to expose alternative clamping surfaces within the opening to clamp onto cross-bars having at least two different cross-sectional shapes, wherein the clamping member is integrally formed from a single material.

13. A system for securing recreational equipment to a cross-bar of a vehicle-mounted rack, the system comprising:

a load-carrying member adapted to carry recreational equipment adjacent a vehicle; and a clamping member associated with the load-carrying member, the clamping member defining an opening configured to receive the cross-bar;

where the clamping member includes structure that is selectively-movable to expose alternative clamping surfaces within the opening to clamp onto cross-bars having at least two different cross-sectional shapes, wherein the selectively-movable structure includes a hinge.

14. The system of claim 13, wherein the selectively-movable structure is movable by pivoting at the hinge.

15. A system for securing recreational equipment to a cross-bar of a vehicle-mounted rack, the system comprising:

a load-carrying member adapted to carry recreational equipment adjacent a vehicle; and a clamping member associated with the load-carrying member, the clamping member defining an opening configured to receive the cross-bar;

where the clamping member includes structure that is selectively-movable to expose alternative clamping surfaces within the opening to clamp onto cross-bars having at least two different cross-sectional shapes, wherein the clamping member is integrally formed with the load carrying member.

16. Apparatus for securing recreational equipment to a crossbar of a vehicle-mounted rack, comprising:

a support member adapted to support recreational equipment adjacent a vehicle; and
   a clamping member adapted to attach the support member to the crossbar;
   where the clamping member is integrally formed from a single material to define an opening that is conformable to grip crossbars of at least two different cross-sectional shapes.

17. The apparatus of claim 16, wherein the clamping member is adapted to snap onto the crossbar.

18. The apparatus of claim 16, wherein the opening is conformable to grip round crossbars and rectangular crossbars.

19. A mount for securing accessories to a bar of a vehicle-mounted rack, comprising:

a clamping portion including structure that defines a first opening configured to receive and grip a bar having a first shape;
where at least a portion of the structure is selectively-removable so that the remaining structure defines a second opening configured to receive and grip a bar having a second shape different than the first shape;
wherein the first and second openings are at least partially defined by common surface area.

20. The mount of claim 19, wherein the first shape is round and the second shape is rectangular.

21. The mount of claim 19, wherein the structure is integrally formed from a single material.

22. The mount of claim 19, wherein the selectively-removable portion of the structure is attached to the clamping portion by a breakable hinge.

23. The mount of claim 22, wherein the clamping portion is configured to snap onto the bar.

24. The mount of claim 19, further comprising an accessory support portion adapted to support accessories adjacent a vehicle.

25. The mount of claim 19, wherein the clamping portion and the accessory support portion are integrally formed from a single material.

* * * * *